United States Patent [19]

Fichter

[11] Patent Number: 4,600,680
[45] Date of Patent: Jul. 15, 1986

[54] TRANSPARENCY FILM ASSEMBLAGE

[75] Inventor: Peter K. Fichter, Canton, Mass.

[73] Assignee: Polaroid Corporation, Cambridge, Mass.

[21] Appl. No.: 718,641

[22] Filed: Apr. 1, 1985

[51] Int. Cl.[4] .......................... G03C 5/54; G03D 9/02
[52] U.S. Cl. .................................... 430/207; 354/304; 430/498
[58] Field of Search ................. 430/207, 498; 354/304

[56] References Cited

U.S. PATENT DOCUMENTS

| | | | |
|---|---|---|---|
| 3,225,670 | 12/1965 | Friedman et al. | 95/13 |
| 3,369,470 | 2/1968 | Downey | 95/13 |
| 3,607,284 | 9/1971 | Harvey | 430/208 |
| 3,615,541 | 10/1971 | Hubert | 430/208 |
| 4,114,166 | 9/1978 | Driscoll et al. | 354/76 |
| 4,132,471 | 1/1979 | Svatek et al. | 354/86 |
| 4,256,527 | 3/1981 | Green | 156/443 |
| 4,279,988 | 7/1981 | Ewald | 430/499 |

Primary Examiner—Richard L. Schilling
Attorney, Agent, or Firm—Alfred E. Corrigan

[57] ABSTRACT

A transparency film assemblage of the type which includes a film mount having first and second apertured sections, a film frame of the instant type mounted on the first section in superposition to its aperture, a strip sheet mounted in superposed relation to the film frame, and a container having a supply of processing liquid which is to be spread between the sheet and the film frame, subsequent to the latter's exposure, to initiate the formation of a visible image in the film frame. The film mount is constructed to accommodate the container and/or the sheet, after the latter has been stripped from the image in the film frame which is to be subsequently viewed, such that the container and/or sheet may be sandwiched between the first and second sections when they are secured in face-to-face relation to define a fully mounted transparency ready to be placed in a projector.

9 Claims, 11 Drawing Figures

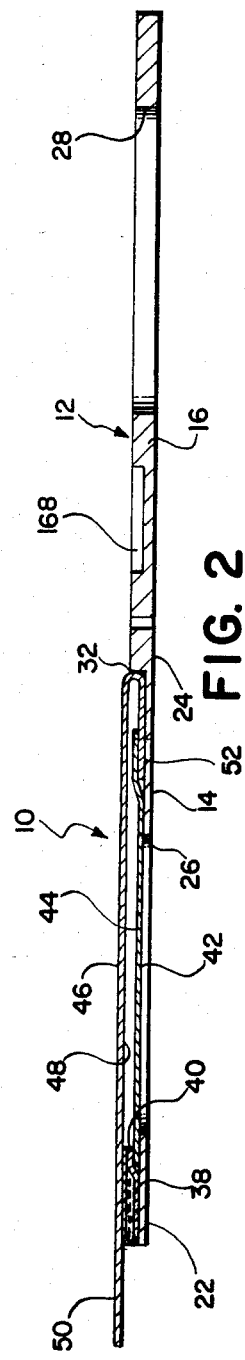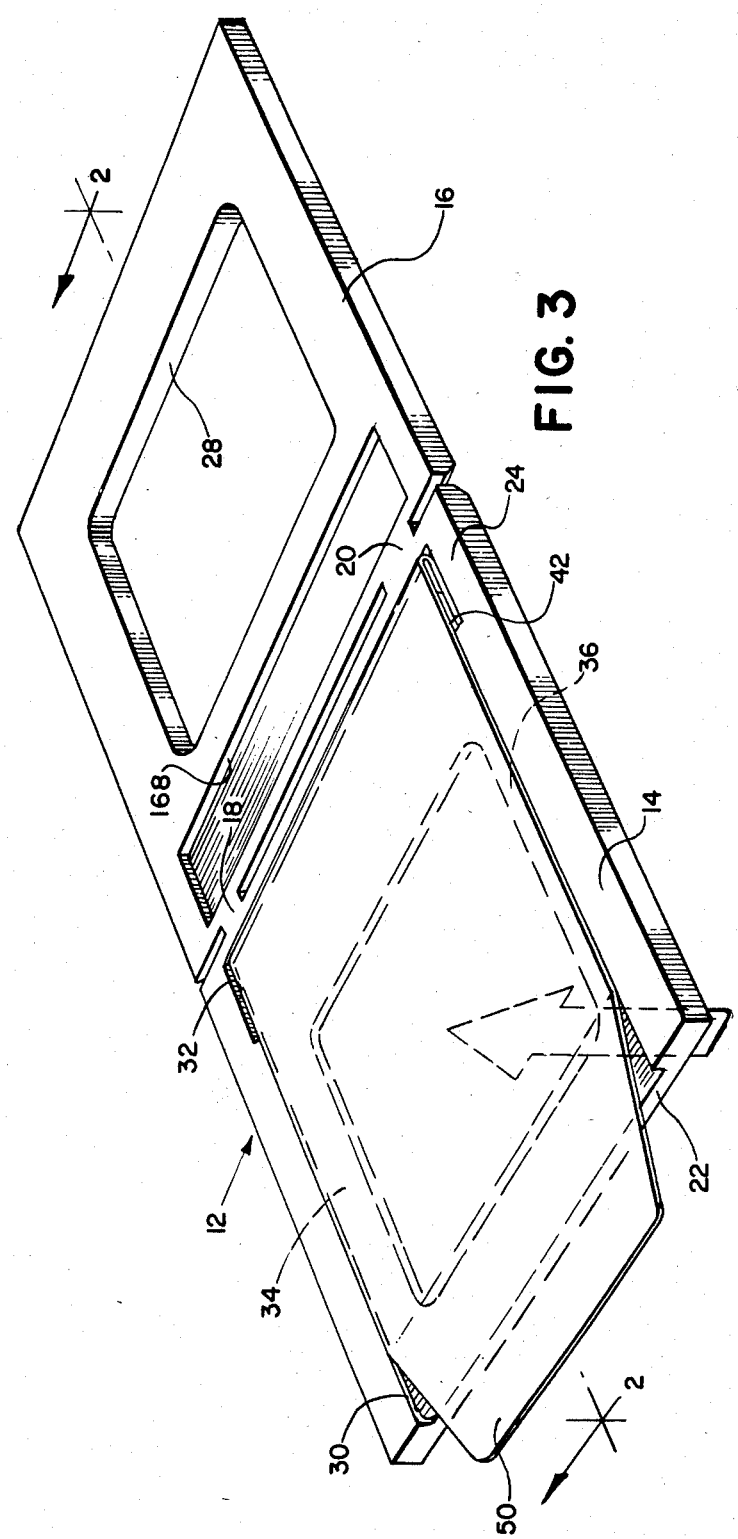

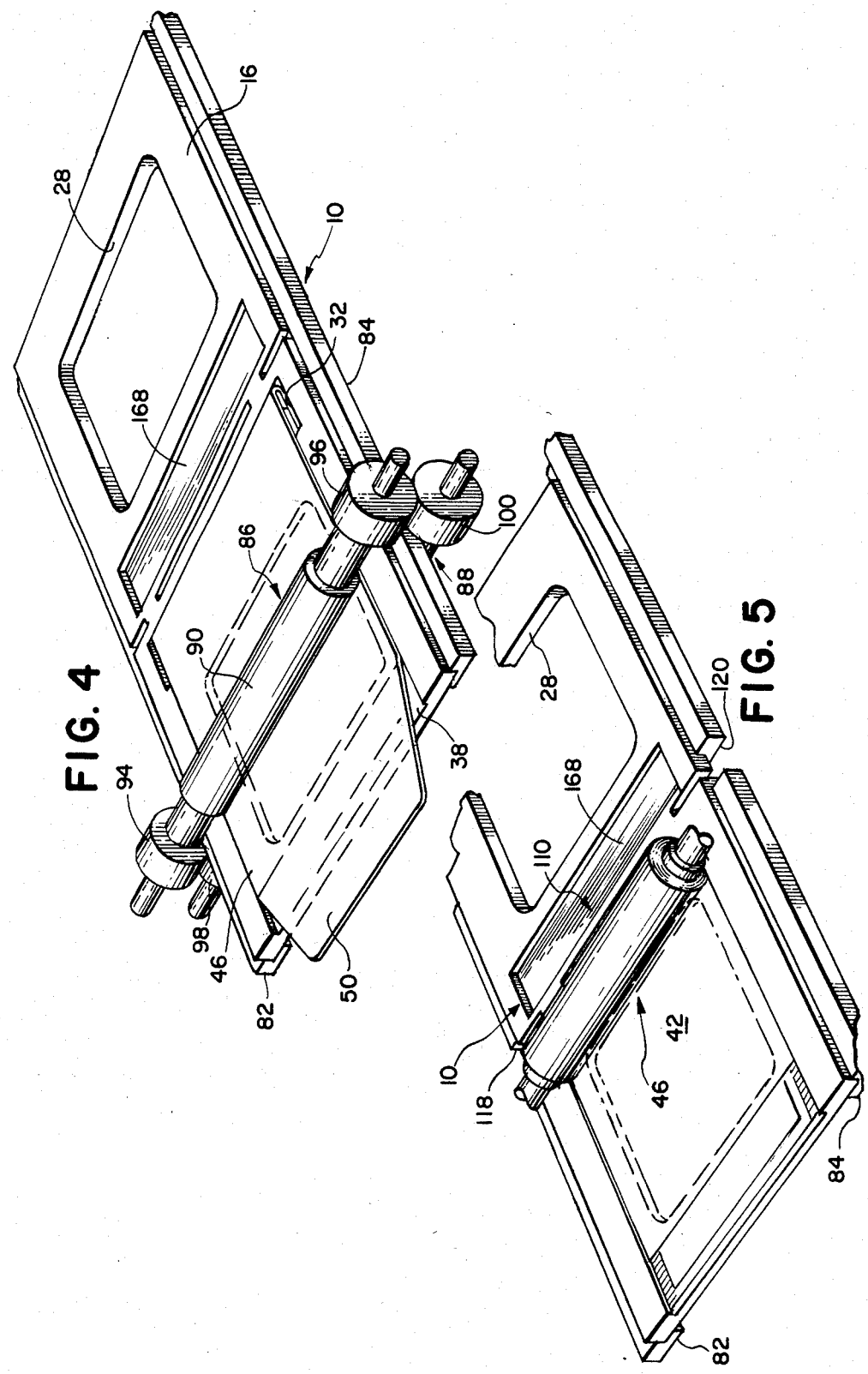

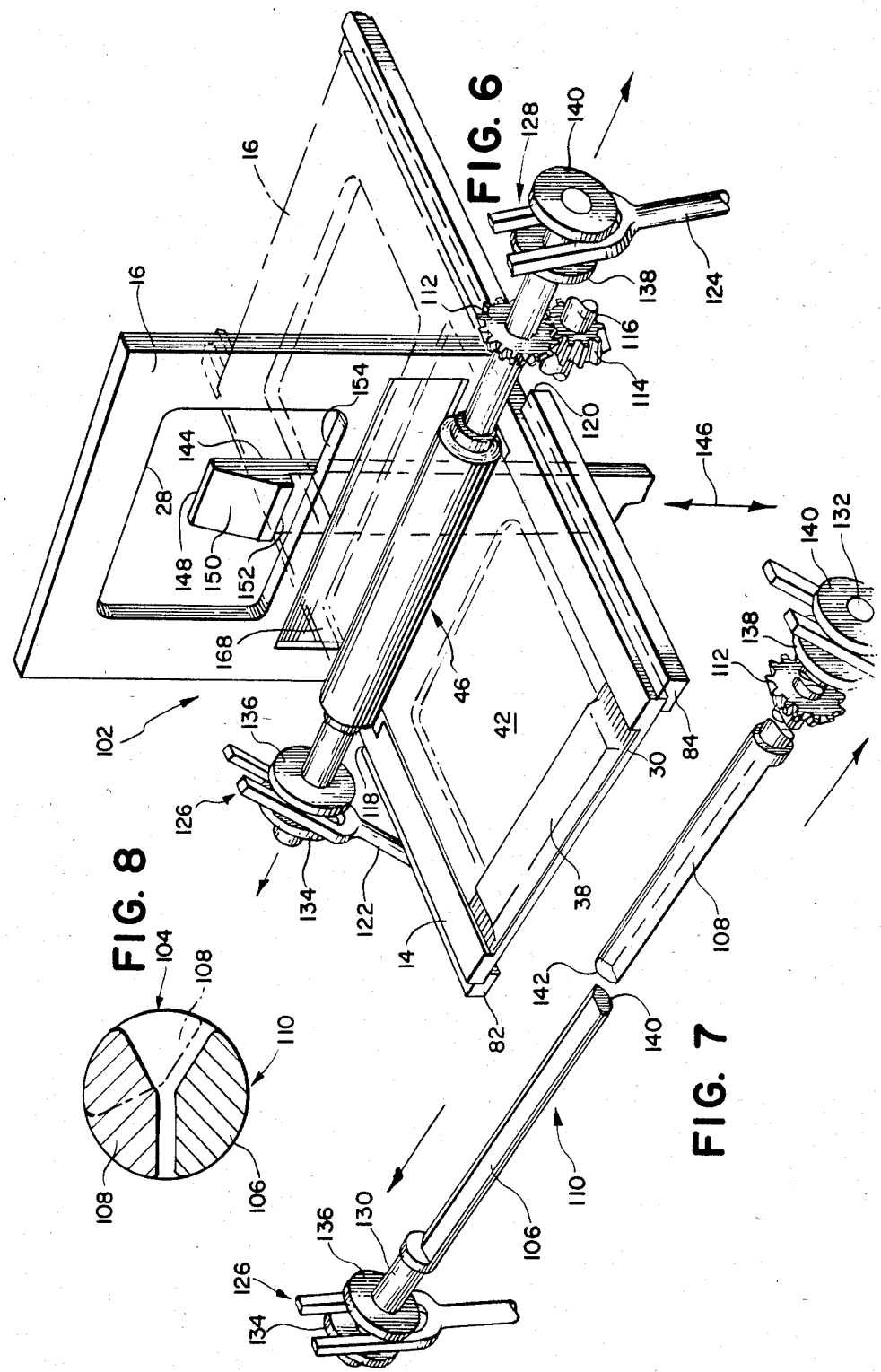

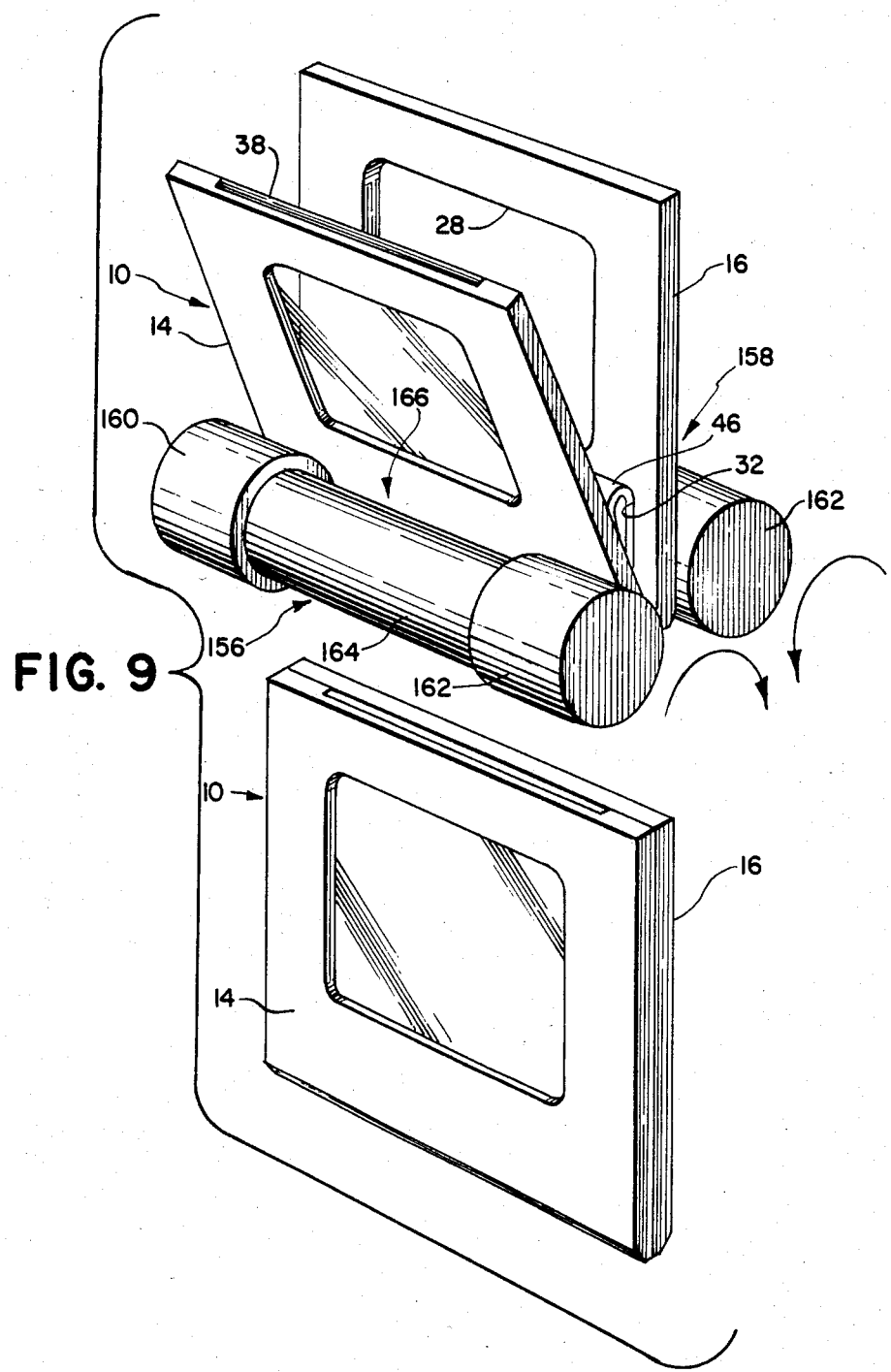

TRANSPARENCY FILM ASSEMBLAGE

CROSS REFERENCE TO RELATED APPLICATION

This application is related to my copending application Ser. No. 718,642 entitled "Apparatus For Processing and/or Projecting Transparency Film Assemblages", filed on instant date herewith.

BACKGROUND OF THE INVENTION

1. Field of the Invention

The invention relates to a transparency film assemblage of the type including instant or self-developing film.

2. Description of the Prior Art

The present invention relates to a transparency film assemblage, and more particularly to such an assemblage having a mount comprised of first and second sections which are adapted to be manipulated into face-to-face relation with each other such that an exposed and developed transparency film frame of the instant type is sandwiched therebetween. The prior art is replete with transparency film assemblages which include, as an element thereof, instant or self-developing type film. For examples of such assemblages reference may be had to U.S. Pat. Nos. 4,279,988, 3,615,541, 3,607,284, 3,369,470, and 3,225,670. However, these transparency film assemblages do have one or more undesirable features. For example, the assemblage described in U.S. Pat. No. 4,279,988 patent requires a multiplicity of elements, thus complicating its assembly. Further, such assemblage is not ready for immediate insertion into a projector after being removed from a camera because its unwanted portions, such as its stripping sheet, liquid container, backing sheet, plug, and front cover sheet, must first be removed from the mount. Finally, the user is left with the problem of the safe and ecologically desirable disposal of these portions which may contain caustic materials left over from the processing of the film. This latter problem, i.e., the disposal of the garbage or residue of the processing operation, applies equally as well to the other patents cited above. Still further, all of the assemblages disclosed in the foregoing patents originally have their components, i.e., film mount, film, strip sheet, and processing liquid container, positioned in a stacked array, rather than having one or more of the components, such as a portion of the film mount, located adjacent to the remainder of the stack thus providing a thinner film assemblage.

The prior art also includes transparency film assemblages of the integral type, as evidenced by U.S. Pat. Nos. 4,132,471 and 4,114,166. Further, U.S. Pat. No. 4,114,166 patent discloses a transparency film assemblage which, subsequent to its photographic exposure and processing, may be immediately placed within a projector for viewing of its visible image. But, because these assemblages are of the so called integral type, the emulsion layer of the film remains as an element of the transparency after processing thus resulting in a transparency having decreased visual acuity and brightness, vis-a-vis a transparency which has had its emulsion layer removed during processing of the transparency. Further, the stability of the image may be adversely affected by virtue of the retention of residual processing liquid in the emulsion layer.

SUMMARY OF THE INVENTION

The present invention relates to a transparency film assemblage of the type including instant or self-developing film, and more particularly to such an assemblage which is garbage free and which may be immediately positioned within a projector subsequent to its processing. Further, the invention relates to such an assemblage which may be mechanically processed by an apparatus into a unit which is ready for such immediate placement in a projector.

The transparency film assemblage includes a film mount consisting of first and second apertured sections which are originally located in side-by-side relation, a rupturable container of processing liquid, an unexposed transparency film frame, and a sheet of flexible material, e.g, a paper based material having a coating of gelatin on one side thereof, located in superposed or face-to-face relation to the transparency film frame with the coating of gelatin facing the film. The sheet of material may be opaque if the transparency film assemblage is located in a stack of similar assemblage when exposed, to thereby prevent exposure of any underlying assemblage.

The transparency film assemblages are adapted to be stacked in a film cassette and individually exposed and removed therefrom for processing, or they may be sequentially moved from the film cassette to an exposure position. After the photographic exposure of a transparency film frame, e.g., to the object lens of a camera or the image on a CRT, the assemblage is moved between a pair of rollers which rupture the container of processing liquid and spread its liquid contents between and in contact with the gelatin coated side of the sheet material (also called a strip or spreader sheet) and the surface of the film most removed from the objective lens so as to initiate the formation of a visible image within the film. After a predetermined period of time, e.g., one minute, an end of the strip sheet is grasped and the sheet peeled back from the film frame so as to uncover an area containing a visible image. The second section of the film mount is then folded into face-to-face relation with and secured to the first section with their apertures in alignment with each other and the transparency film frame sandwiched therebetween. Also sandwiched therebetween are the expended processing liquid container and the strip sheet. The garbageless, fully processed, transparency film assemblage may now be placed within a viewer or projector for viewing of the photographed image.

An object of the invention is to provide a transparency film assemblage of the type which includes instant type film, and a two piece film mount which is adapted to enclose the film and at least one of the spent elements used in the processing of the instant type film.

Another object of the invention is to provide a transparency film assemblage of the type described with a film mount having a recessed area for enclosing a spent element of a processing operation.

Still another object of the invention is to provide a transparency film assemblage which contains a minimum of elements and is adapted for mechanized or manual processing.

Still another object of the invention is to provide a transparency film assemblage, of the type having instant or self-developing film, which is relatively gargage free after completion of its processing.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For fuller understanding of the nature and objects of the invention, reference should be had to the following detailed description taken in connection with the accompanying drawings wherein:

FIG. 2 is a cross-sectional view of the transparency film assemblage taken along the line 2—2 in FIG. 3;

FIG. 3 is a perspective view of the transparency film assemblage;

FIG. 4 is a perspective view of the transparency film assemblage as it moves between a pair of processing rollers;

FIG. 5 is a perspective view of the transparency film assemblage as one of its elements is being stripped from a film frame;

FIG. 6 is a perspective view of the transparency film assemblage during another step in its processing;

FIG. 7 is a partially exploded perspective view of a roller used in the stripping step shown in FIGS. 5 and 6;

FIG. 8 is a cross-sectional view of the roller shown in FIGS. 5-7;

FIG. 9 is a perspective view of the transparency film assemblage during and after its passage between a pair of laminating rollers;

DETAILED DESCRIPTION OF THE INVENTION

Figure 1:
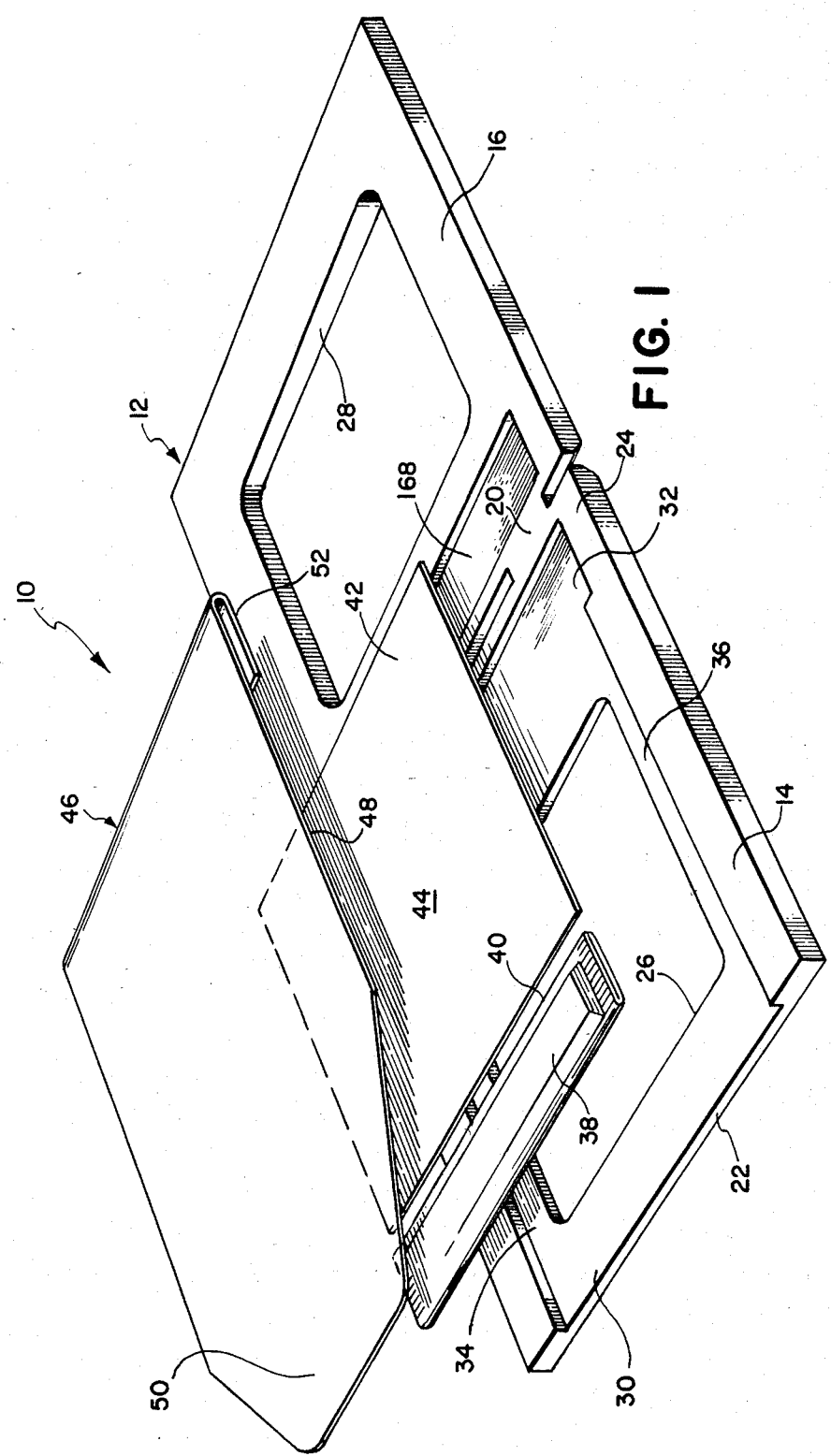
FIG. 1 is an exploded perspective view of a preferred embodiment of a transparency film assemblage.

Reference is now made to the drawings, and in particular to FIGS. 1-3, wherein is shown a preferred embodiment of a transparency film assemblage 10. The assemblage 10 includes a mount 12 formed from any suitable material, e.g., plastic. The mount 12 includes first and second sections 14 and 16 having means in the form of integral hinges 18 and 20 connecting the two sections 14 and 16 to each other for movement of the second section 16 from the position shown in FIGS. 1-3 to the position shown in FIG. 9. The first section 14 includes first and second ends 22 and 24 which are separated by a first aperture 26 while the second section 16 has a second aperture 28 therein which is generally of the same dimensions as the first aperture 26. The first end 22 of the first section 14 is provided with a laterally extending recess 30 and the second end 24 of the first section 14 is provided with a second, slighly longer, recess 32 as measured in a lateral direction. The first and second recesses 30 and 32 are interconnected by a pair of longitudinally extending recesses 34 and 36. Mounted within the first recess 30 is a conventional pod or rupturable container 38 of processing liquid having a discharge end 40 facing in the direction of the first aperture 26.

The transparency film assemblage 10 also includes an unexposed film frame 42 of the self-developing or instant type, which film is well known and may be of the type shown and described in U.S. Pat. No. 4,375,324.

The film frame 42 has portions of its peripheral edges secured to horizontal surfaces of the recesses 30, 32, 34 and 36 such that an emulsion layer 44 thereof is located immediately below the discharge end 40 of the pod or container 38.

Also an element of the transparency film assemblage 10 is a sheet of material 46 having a coating of gelatin on a major surface 48 thereof. The sheet of material 46 is adapted to be located in superposed relation to the film frame 42 with its gelatin coated surface 48 in face-to-face relation with the emulsion layer 44 of the film frame 42. The sheet 46 has a width substantially equal to the width of the film frame 42 and a length which is longer than the corresponding dimension of the film frame 42. This longer length provides for a tapered leading end 50, which extends forwardly of the first end 22 of the first section 14, and a trailing end 52 which is folded under itself and the right hand end of the film frame, as viewed in FIG. 2. The trailing end 52 is suitably secured to the underside of the end of the film frame 42 to thereby define a trap 54 for containing any excess processing liquid that may remain after the spreading of the liquid between the film frame 42 and the sheet 46, as will be more fully described later.

A plurality of the film assemblages 10 are adapted to be stacked within a film cassette 56 with the first and second sections 14 and 16 of each film frame 12 located in side-by-side relation thus providing for a relatively slender film cassette 56. As mentioned above, the photographic exposure of each assemblage 10 may take place while the assemblage is located in the film cassette 56, in which case the sheet material 46 is opaque or an opaque insert is located between adjacent assemblages 10 in the stack, thus preventing the exposure of more than one assemblage 10 at a time. Alternatively, the assemblages 10 may be moved, sequentially, to the outside of the film cassette 56 for their photographic exposure, as shown in FIG. 10.

Figures 10, 11:
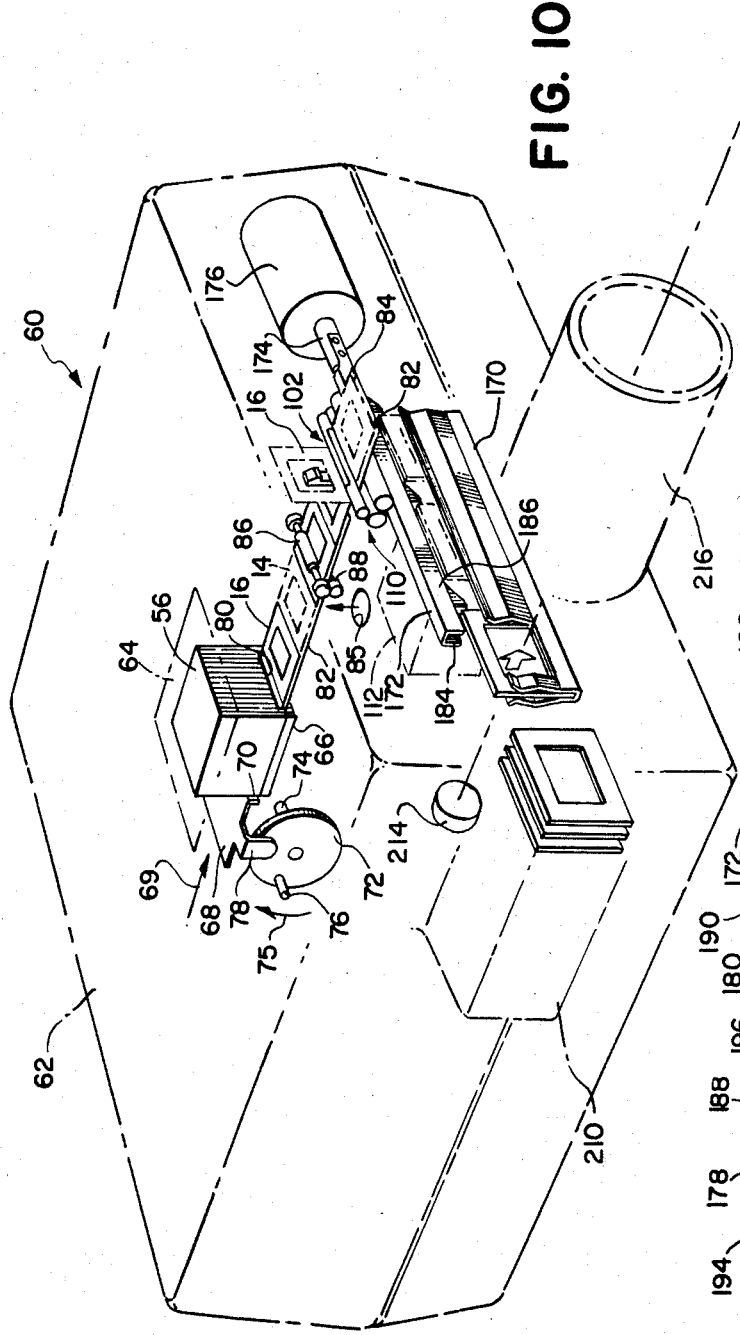
FIG. 10 is a perspective view, partly in phantom lines, showing an apparatus for processing the transparency film assemblages.
FIG. 11 is an enlarged view of a portion of the apparatus shown in FIG. 10.

The film cassette 56 is adapted to be placed in an apparatus 60, as shown in FIG. 10. The apparatus 60 includes a housing 62, shown in phantom lines, having a loading door 64 through which the film cassette 56 may be inserted and positioned on a support plate 66. Located to the left of the support plate 66 (as viewed in FIG. 10) is a transparency film assemblage advancing means 68 having a vertical flange 70 of a width and depth substantially equal to that of the trailing end of the second section 16 of a film mount 12 which it is adapted to engage during movement of the assembly 10. The advancing means 68 is adapted to be moved in the direction of the arrow 69 by a mechanism including a disc 72 mounted on a driven shaft 74. A pin 76 extends outwardly from a face of the disc 72 and is adapted to be rotated in the direction of the arrow 75 into engagement with a downwardly extending portion 78 of the advancing means 68 to initially drive the advancing means 68 through a distance just sufficient to enable the flange 70 to enter the cassette 56 and advance a transparency film assemblage 10 from the film cassette 56 via an exit slot 80 to an exposure position whereat its longitudinally extending sides are supported by a pair of longitudinally extending L-shaped rails 82 and 84. After the film frame 42 of the assemblage 10 has been exposed to image bearing rays which enter the apparatus 60 via an aperture in its bottom wall, the drive to the shaft 74 is again energized. Note, at this time the pin 72 is still in engagement with the portion 78. This second energization of the shaft 74 continues the movement of the advancing means 68 in the direction of the arrow 69 until the first end of the first section 14 of the assemblage 10 enters the bite of a pair of pregapped rollers 86 and 88. The roller 86 includes a central section 90 of a given diameter and having a length slightly less than the width of the recess 30 whereas the roller 88 includes a similar central section having a length less than the distance between the rails 82 and 84. The roller 86 further includes end sections 94 and 96 which are adapted to engage similar end sections 98 and 100 on the roller 88 to establish a minimum gap between the rollers 86 and 88 and the thickness of the layer of processing liquid to be spread between the film frame 42 and the sheet material 46. The diameters of the end sections 94, 96, 98 and 100 are slightly greater than that of the central section of each roller. The roller 86 is resiliently mounted for movement in a vertical direction toward and away from the roller 88 (which is fixed against such movement) by any suitable means (not shown). The central section of each roller is separated from its respective end sections by intermediate sections having a diameter less than that of the central section. These intermediate sections provide for clearance of the longitudinal sides of the assemblages and the rails 82 and 84. The rollers 86 and 88 are adapted to be driven in the direction of the arrows so as to advance the assemblage 10 toward a stripping station 102 while simultaneously rupturing the container 38 and spreading its contents between the emulsion side 44 of the film frame 42 and the gelatin coated surface 48 of the sheet material 46, with any excess processing liquid being collected in the second recess 32.

As the film assemblage 10 approaches the stripping station 102, the tapered end 50 of the sheet material 46 enters a converging gap 104 defined by first and second portions 106 and 108, respectively, of a stripping roller 110. One end of the second portion 108 is provided with a bevel gear 112 which is adapted to be moved into and out of driven engagement with a second bevel gear 114 which is fixedly mounted on a drive shaft 116. After (1) the end 50 of the sheet material 46 has entered the gap 104 of the stripping roller 110, (2) the assemblage 10 has moved out of engagement with the rollers 86 and 88, and (3) the formation of a visible image in the film frame 42 has been initiated, a drive to the shaft is energized so as to rotate the second portion 108 from the solid line position, as shown in FIG. 8, to the broken line position thereby substantially narrowing the gap 104 while also functioning to pinch the end 50 of the sheet material 46 between facing surfaces of the first and second portions 106 and 108. Further rotation of the second portion 108 in a clockwise direction is effective to drive the first portion 106 in the same direction thereby causing the sheet material 46 to be wound upon the stripping roller 110 as it is being stripped from the film frame 42. During this period of winding the sheet material 46 upon the stripping roller 110, the assemblage 10 is being advanced to the left, as viewed in FIG. 6, until the integral hinges 18 and 20 thereof are located above a separation 118 and 120 in the L-shaped rails 82 and 84, respectively. As the sheet material 46 is being stripped from the film frame 42 it also removes the film frame's photosensitive layer 44 thus increasing visual acuity and brightness of the resultant positive transparency while also enhancing its stability by virtue of the removal of residual processing liquid in the photosensitive or emulsion layer 44. An example of such a film may be found in U.S. Pat. No. 3,682,637, granted to E. H. Land on Aug. 8, 1972. Rotation of the gripping roller 110 in the clockwise direction is stopped when it is located immediately above the second recess 32, as best shown in FIGS. 5 and 6, and the second portion 108 is in the broken line position shown in FIG. 8. The drive to the shaft 116 is then momentarily reversed to thereby move the second portion 108 into its solid line position in FIG. 8 thus releasing the roller's grip on the tapered end 50 of the sheet material 46. The first and second portions 106 and 108 of the stripping roller 110 are removed from the core of the roll of stripped sheet material 46 and the film's emulsion layer 44 by rotating a pair of Y-shaped members 122 and 124 about horizontal axes (not shown) in a direction away from each other. Each of the Y-shaped members 122 and 124 includes a pair of legs 126 and 128 which straddle end shafts 130 and 132 of the stripping roller 110 and are trapped between annular flanges 134 and 136 on the end shaft 130 and similar flanges 138 and 140 on the end shaft 132. Such movement of the Y-shaped members 122 and 124 is sufficient to remove the ends 140 and 142 of the first and second portions 106 and 108, respectively, of the stripping roller 110 from the ends of the roll of sheet material 46, thus leaving the latter sitting in the second recess 32 of the first section 14 of the film mount 12. Suitable means (not shown) are provided for supporting the first and second portions 106 and 108 in a horizontal plane during their movement toward and away from each other.

After the ends 140 and 142 of the first and second portions 106 and 108 of the stripping roller 110 have been removed from the roll of sheet material 46, the motor (not shown) of the apparatus 60 is energized to drive an elongate member 144 in a reciprocating manner, as indicated by the arrow 146. As the elongate member 144 moves upwardly, its end 148 engages an under surface of the second section 16 of the film mount 12 at a point intermediate its connection to the first section 14 and the aperture 28, thus pivoting the second section 16 from the broken line to the solid line position shown in FIG. 6. During the latter portion of such upward movement, an inclined surface 150 on the member 144 cams the second section into the vertical position wherein an undercut portion 142 is located above and in alignment with an edge 154 of the second aperture 28. At this time the elongate member's direction of movement is reversed thereby causing the undercut portion 152 to engage the edge 154 and pull the film mount 12 downwardly towards and into the bite of a pair of identical rollers 156 and 158 (FIG. 9). Each of the rollers 156 and 158 is provided with end portions 160 and 162 of a greater diameter than their intermediate portion 164 so as to define a gap 166 through which the elongate member 144 may be reciprocated without touching the rollers 156 and 158. As the second section 16 of the film mount 12 is being pulled downwardly, the first section 14 automatically pivots or folds itself toward the second section 16 as the two sections 14 and 16 pass between the separations 118 and 120 in the rails 82 and 84, respectively. During such folding, the roll of sheet material 46 is gradually encompassed and compressed within a chamber defined by the aforementioned second recess 32 in the first section 14 and a correspondingly configured recess 168 located in the second section 16. Also, the expended container 38 is sandwiched between the two sections as they pass between the rollers 156 and 158. Suitable means (not shown) such as adhesive coated mating surfaces or interlocking snap members may be provided for maintaining the two sections 14 and 16 in face-to-face relation with their respective apertures 26 and 28 located in alignment with each other and with the area of the film frame which is adapted to be viewed. One or both of the rollers 156 and 158 may be power driven or the assemblage 10 may be completely pulled between the rollers 156 and 158 by the elongate member 144.

As the now fully processed film assemblage 10 moves away from the folding means, i.e., the elongate member 144 and the rollers 156 and 158, it is deflected forwardly into a generally horizontally extending track 170 wheren its trailing or upper end is located below a longitudinally extending U-shaped rail 172. One end of the rail 172 is connected to an armature 174 of a solenoid 176 for reciprocating movement in a horizontal direction. A plurality of members 178, 180, and 182 are pivotally connected between opposite walls 184 and 186 of the rail 172 by pivot pins 188, 190, and 192. The members 178, 180 and 182 are normally resiliently biased into the position shown in FIG. 11 by springs 194, and 198 and stopped therein by any suitable means (not shown). Also, each of the members 178, 180 and 182 includes a generally vertical edge 200, 202 and 204, respectively, for engaging and moving an assemblage 10 to the left, as viewed in FIG. 11, and an inclined surface 206, 208 and 210, respectively, which is adapted to be engaged by an assemblage 10 during movement of the rail 172 to the right for camming the members 178, 180 and 182 upwardly to an inoperative position wherein they may pass over the assemblages 10.

In the situation depicted in FIGS. 10 and 11, three fully processed transparency film assemblages 10 are located in the track 170 with the one on the right located below the stripping station 102, the intermediate assemblage 10 located in a position wherein it may be moved rearwardly into an accumulation chamber 212 (shown in phantom lines for reasons of clarity) or further to the left into a projection station wherein a lamp 214 may project the image in the assemblage 10 through a lens tube 216 on a viewing screen, and the left assemblage 10 which is located at the projection station. When the solenoid 176 is energized it drives the U-shaped rail 172 to the left thereby causing the member 178 to move the left assemblage 10 from the projection station into a storage chamber 218 wherein it urges a stack of assemblages 10 rearwardly as it occupies an endmost position in the stack. Simultaneously therewith, the intermediate assemblage 10 is moved into the projection station and the right hand film assemblage 10 is moved into the position previously occupied by the intermediate film assemblage 10. Upon deenergizing the solenoid 176 the U-shaped rail 172 moves to the right thereby causing the members 178 and 180 to be cammed upwardly so that they may pass over and drop in behind the assemblages 10 located in the projection station and in front of the accumulation chamber 212, respectively, thus leaving the right hand end of the track 170 empty in preparation to receiver another fully processed transparency film assemblage 10 from the rollers 156 and 158.

Since certain changes may be made in the above described invention without departing from the scope thereof, it is intended that all matter contained in the above description or shown in the accompanying drawings shall be interpreted as illustrative and not in a limiting sense.

What is claimed is:

1. A transparency film assemblage, comprising:

a mount including first and second sections, said first section including first and seconed ends separated by means for defining a first aperture, and said second section including means for defining a second aperture;

a rupturable container of processing liquid having a discharge end positioned adjacent said first end of said first section;

an unexposed transparency film frame of the instant type secured to said first section in superposition to said first aperture with an end of said film frame positioned to receive upon a major surface thereof said processing liquid when expressed from said end of said rupturable container, said transparency film frame includes a strippable photosensitive layer;

a sheet of material adapted to be located in superposed relation to said film frame, said sheet being constructed to assist in the spreading of said processing liquid across said major surface of said film frame, subsequent to its photographic exposure, so as to initiate the formation of a visible image in said transparency film frame, said sheet also being adapted to strip said photosensitive layer from said transparency film frame subsequent to the formation of the visible image; and means connecting said second end of said first section to said second section for movement of said second section from a first position, wherein said sheet together with said photosensitive layer may be stripped from superposed relation with an area of said film frame which is to be subsequently viewed, to a second position, wherein said first and second sections are folded upon each other with said sheet and said photosensitive layer located therebetween and with said first and second apertures located in alignment with each other and with said film frame sandwiched therebetween whereby said transparency film assemblage is in condition to be placed within a projector for subsequent viewing of the uncovered area of said film frame.

2. A transparency film assemblage as defined in claim 1 further including means for defining a first recess in said first end of said first section for receiving said container of processing liquid.

3. A transparency film assemblage as defined in claim 2 wherein said first recess has a depth sufficient to accommodate said container after removal of its processing liquid and after movement of said second section into said second position.

4. A transparency film assemblage as defined in claim 2 further including means in said second end of said first section for defining a second recess, said second recess being adapted to receive any excess processing liquid which may be left after the processing liquid has been expressed from said container and spread between said transparency film frame and said sheet.

5. A transparency film assemblage as defined in claim 4 wherein said second recess is adapted to receive said sheet and said photosensitive layer after its removal from superposed relation with the area of said transparency film frame.

6. A transparency film assemblage as defined in claim 5 further including means in said second section for defining a third recess, said third recess being adapted to cooperate with said second recess in said first section to substantially enclose said sheet and said photosensitive layer when said second section is in said second position.

7. A transparency film assemblage as defined in claim 1 further including means for defining a recess in said second end of said first section, said recess being adapted to receive any excess processing liquid which may be left after the processing liquid has been expressed from said container and spread between said transparency film frame and said sheet.

8. A transparency film assemblage as defined in claim 7 wherein said recess is adapted to receive said sheet and said photosensitive layer after its removal from superposed relation with an area of said transparency film frame.

9. A transparency film assemblage as defined in claim 8 further including means in said second section for defining a second recess, said second recess being adapted to cooperate with said recess in said first section to substantially enclose said sheet and said photosensitive layer when said second section is in said second position.

* * * * *